United States Patent
Guo et al.

(10) Patent No.: US 11,330,761 B2
(45) Date of Patent: May 17, 2022

(54) GRASS TRIMMER HEAD AND GRASS TRIMMER LINE SUITABLE FOR A GRASS TRIMMER HEAD

(71) Applicant: Nanjing Chervon Industry Co., Ltd., Nanjing (CN)

(72) Inventors: Jianpeng Guo, Nanjing (CN); Yi Xu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 16/808,747

(22) Filed: Mar. 4, 2020

(65) Prior Publication Data

US 2020/0281116 A1 Sep. 10, 2020

(30) Foreign Application Priority Data

Mar. 7, 2019 (CN) .......................... 201910171300.9

(51) Int. Cl.
*A01D 34/416* (2006.01)

(52) U.S. Cl.
CPC ................................ *A01D 34/4168* (2013.01)

(58) Field of Classification Search
CPC .......................... A01D 34/4168; A01D 34/416
See application file for complete search history.

(56) References Cited

U.S. PATENT DOCUMENTS 6,874,235 B1 * 4/2005 Legrand ............ A01D 34/4168
30/276
2019/0373808 A1 * 12/2019 Bindhammer ..... A01D 34/4168

FOREIGN PATENT DOCUMENTS

WO    WO-2007018440 A1 *  2/2007  ......... A01D 34/4168

* cited by examiner

*Primary Examiner* — Omar Flores Sanchez
(74) *Attorney, Agent, or Firm* — Greenberg Traurig, LLP

(57) ABSTRACT

A grass trimmer line includes a first line body having a first free end and a first non-free end and a second line body having a second free end and a second non-free end. A length of the second line body is substantially equal to a length of the first line body. The first line body has a first feature, the second line body has a second feature corresponding to the first feature, and the second feature is different from the first feature. A connecting portion is configured to connect the first non-free end of the first line body and the second non-free end of the second line body so that the first line body and the second line body are connected into the complete grass trimmer line.

17 Claims, 7 Drawing Sheets

GRASS TRIMMER HEAD AND GRASS TRIMMER LINE SUITABLE FOR A GRASS TRIMMER HEAD

RELATED APPLICATION INFORMATION

This application claims the benefit under 35 U.S.C. § 119(a) of Chinese Patent Application No. CN 201910171300.9, filed on Mar. 7, 2019, and Chinese Patent Application No. CN 201911399580.5, filed on Dec. 30, 2019, each of which is incorporated by reference in its entirety herein.

TECHNICAL FIELD

The present disclosure relates to an accessory in the field of garden tools, and in particular to a grass trimmer line used for a grass trimmer.

BACKGROUND

As a commonly used garden tool, a grass trimmer generally includes a grass trimmer head for trimming, and the grass trimmer head is used for mounting a grass trimmer line to cut vegetation when driven by a motor. The grass trimmer line usually has a certain storage length accommodated in the grass trimmer head. At present, two types of winding, i.e., manual winding and automatic winding, exist when the grass trimmer line is wound to the grass trimmer head. Regardless of manual winding or automatic winding, in order to ensure the trimming efficiency, the lengths of the grass trimmer line on two sides of the grass trimmer head are expected to be approximately equal. At present, most grass trimmer lines have a single design. A user can merely align the center point of the grass trimmer line with the center axis of the grass trimmer head through manual adjustment, which will waste the user's working time and reduce working efficiency.

SUMMARY

In one aspect of the disclosure, a grass trimmer line suitable for a grass trimmer head includes: a first line body including a first free end and a first non-free end; a second line body including a second free end and a second non-free end, where a length of the second line body is substantially equal to a length of the first line body, the first line body has a first feature, the second line body has a second feature corresponding to the first feature, and the second feature is different from the first feature; and a connecting portion configured to connect the first non-free end of the first line body and the second non-free end of the second line body, so that the first line body and the second line body are connected into the complete grass trimmer line.

In another aspect of the disclosure, a grass trimmer line suitable for a grass trimmer head includes: a first line body including a first free end and a first non-free end; and a second line body including a second free end and a second non-free end. A length of the second line body is substantially equal to a length of the first line body, the first line body has a first feature, the second line body has a second feature corresponding to the first feature, and the second feature is different from the first feature; the second non-free end is connected to the first non-free end.

In one aspect of the disclosure, a grass trimmer head includes a spool, which is configured for a grass trimmer line winding around; a head housing, which is formed with an accommodation space for accommodating at least part of the spool, is further formed with a left threading hole for the grass trimmer line to come out from a left side of the grass trimmer head, and is further formed with a right threading hole for the grass trimmer line to come out from a right side of the grass trimmer head. The grass trimmer line includes: a first line body including a first free end and a first non-free end; a second line body including a second free end and a second non-free end, where a length of the second line body is substantially equal to a length of the first line body, the first line body has a first feature, the second line body has a second feature corresponding to the first feature, and the second feature is different from the first feature; and a connecting portion configured to connect the first non-free end of the first line body and the second non-free end of the second line body, so that the first line body and the second line body are connected into the complete grass trimmer line.

The advantage of the present disclosure is that: the grass trimmer line of the present disclosure is specially designed and has obvious visualization effects, which can enable the operator to quickly find the midpoint or quickly align with the grass trimmer head, and thus, the winding efficiency of the operator is improved.

DETAILED DESCRIPTION

Figure 1:
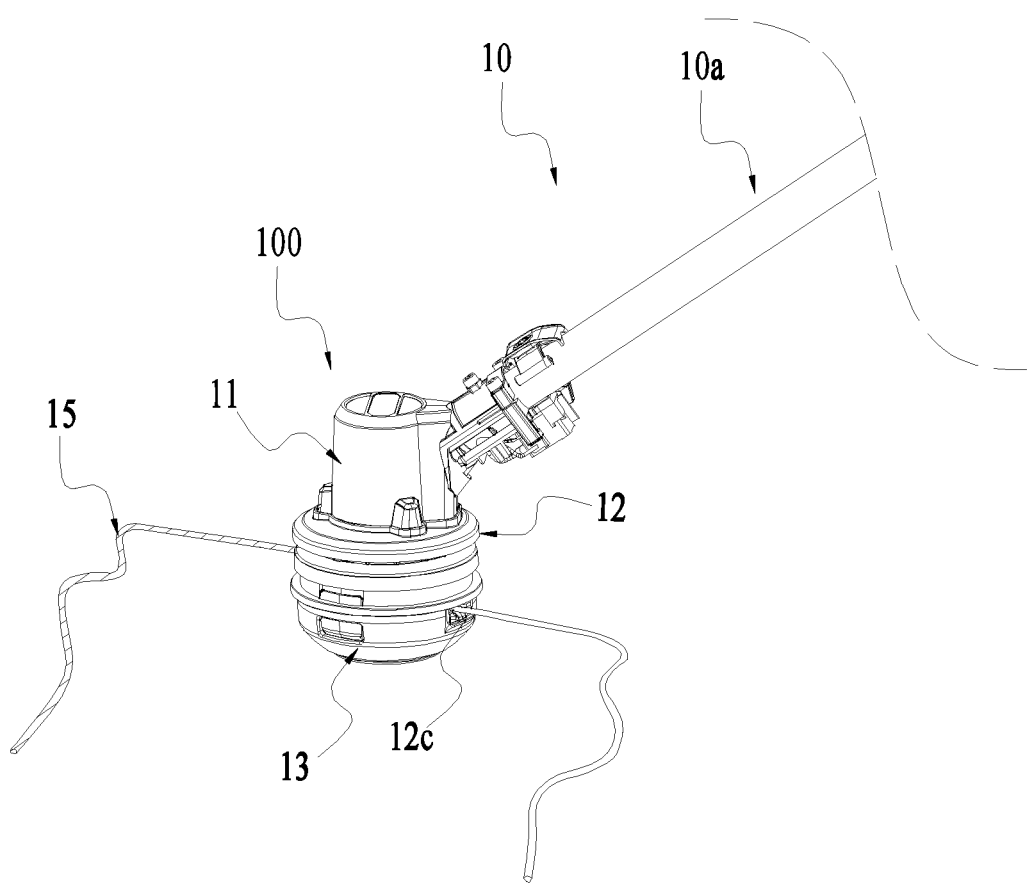
FIG. 1 is a perspective of a grass trimmer according to a first example.

As shown in FIG. 1, a cutting tool 10 is used for trimming lawns, weeds, and other vegetation. In this example, the cutting tool is a grass trimmer. Of course, it can be understood that in other examples, the cutting tool may also be a lawn mower, a brush cutter, an edge trimmer, etc.

Figure 2:
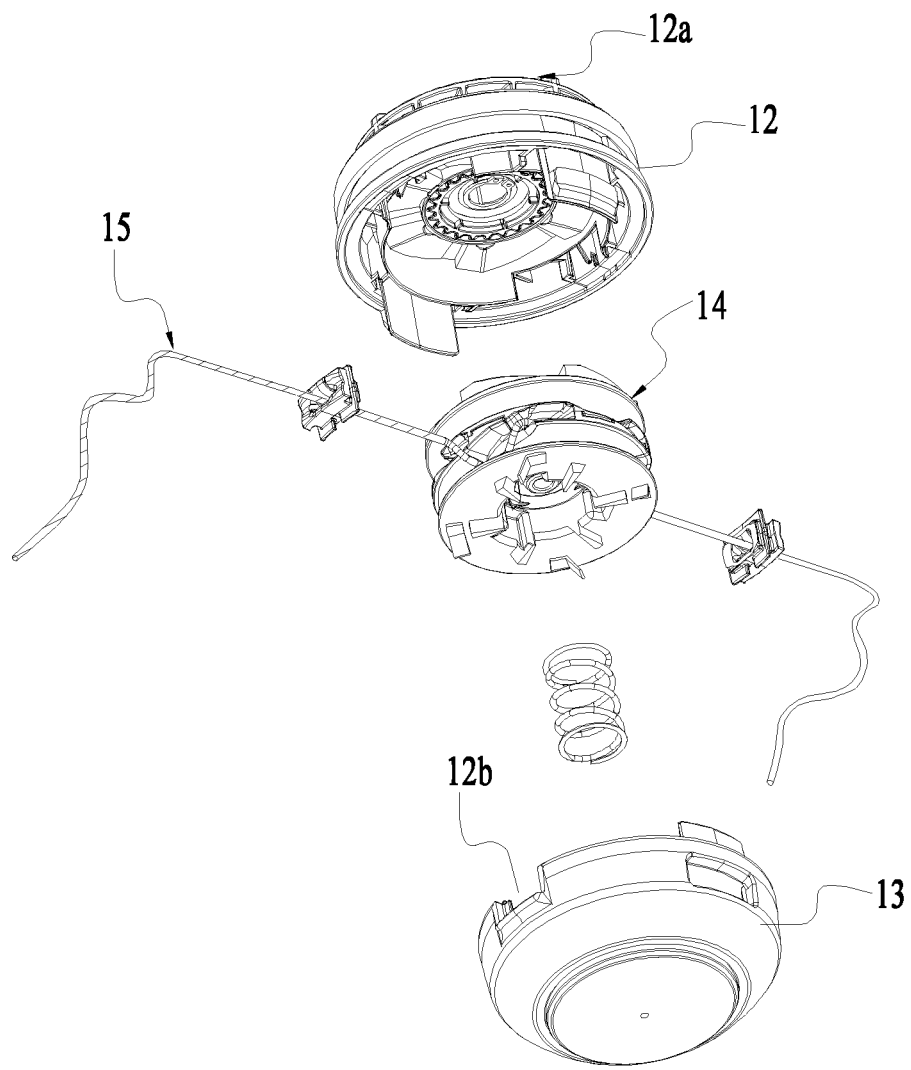
FIG. 2 is an exploded view of a grass trimmer head in the grass trimmer of FIG. 1.

The cutting tool 10 includes an operation component 10a and a cutting component. The operation component 10a is used for operation by a user. For the grass trimmer, the cutting component is a grass trimmer head 100. As shown in FIG. 1 and FIG. 2, the cutting tool 10 includes a motor 11, which is used for driving the grass trimmer head 100 to rotate, and a grass trimmer line 15 is mounted on the grass trimmer head 100. When the motor 11 drives the grass trimmer head 100 to rotate, the grass trimmer head 100 drives the grass trimmer line 15 to rotate at a high speed, so that the grass trimmer line 15 rotating at a high speed can cut vegetation. The grass trimmer head 100 includes a head housing 12a and a spool 14. The head housing includes an upper cover 12 and a lower cover 13, the spool 14 is driven to rotate by the motor 11, and the spool 14 is at least partially disposed in an accommodation space surrounded by the head housing. The upper cover 12 and the lower cover 13 are snapped together to form the accommodation space, the spool 14 is mounted in the accommodation space, and the motor drives the spool 14 to rotate. The spool 14 is provided with a thread entry hole and a thread exit hole for the grass trimmer line 15 to pass through. The lower cover 13 includes a left thread entry hole and a right thread exit hole. The head housing 12a is further formed with a left threading hole 12b for the grass trimmer line 15 to come out from the left side of the grass trimmer head 100, is further formed with a right threading hole 12c for the grass trimmer line 15 to come out from the right side of the grass trimmer head 100.

Figure 3:
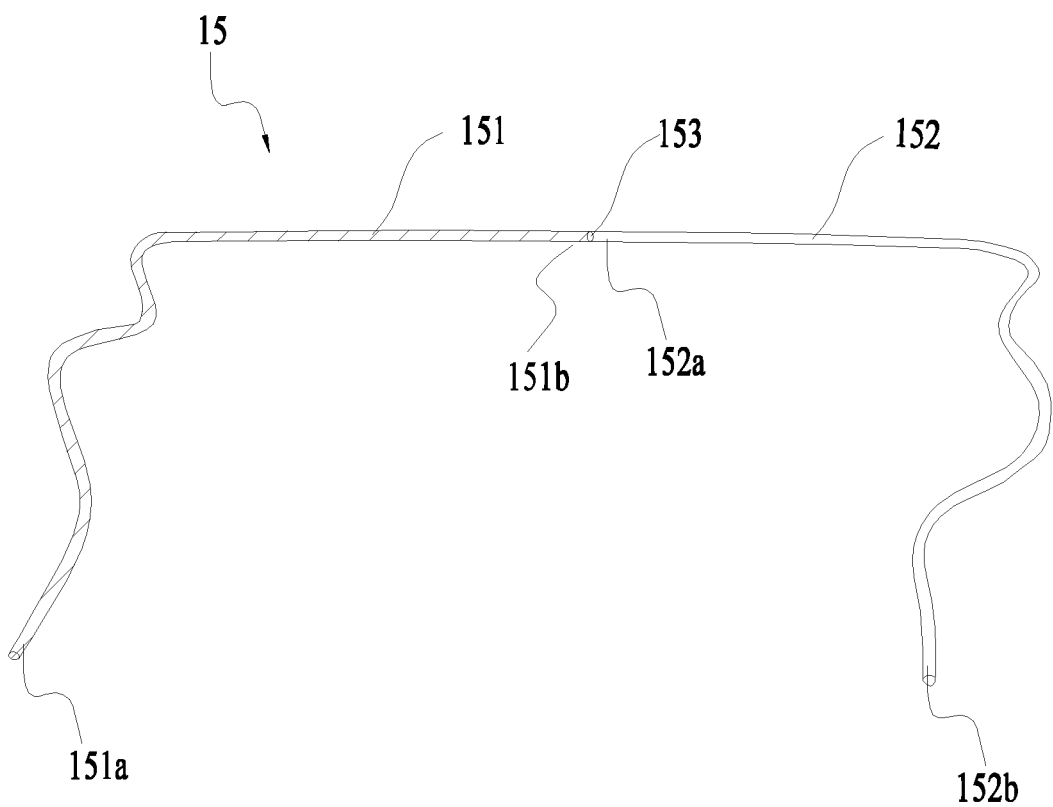
FIG. 3 is a plan view of a grass trimmer line in the grass trimmer of FIG. 1.

As shown in FIG. 3, the grass trimmer line 15 includes a first line body 151, a second line body 152 and a connecting portion 153. The first line body 151 has a first free end 151a and a first non-free end 151b. The second line body 152 has a second free end 152a and a second non-free end 152b. The connecting portion 153 connects the first non-free end 151b of the first line body 151 and the second non-free end 152b of the second line body 152, so that the first line body 151 and the second line body 152 are connected into the complete grass trimmer line 15. The lengths of the first line body 151 and the second line body 152 are substantially equal. The first line body 151 has a first feature, and the second line body 152 has a second feature corresponding to the first feature, where the first feature is different from the second feature. The second feature corresponding to the first feature is that the second feature and the first feature respectively represent the same attribute of the second line body 152 and the first line body 151. For example, in this example, the first feature is a first color, then the second feature corresponding to the first feature should also refer to a color, and in this example, the second feature is a second color correspondingly. In this way, the first line body 151 has the first color, the second line body 152 has the second color, and the second color is different from the first color.

In other examples, the first feature is a first pattern, the second feature is a second pattern, and the second pattern is different from the first pattern, that is, the first line body has the first pattern, and the second line body has the second pattern different from the first pattern. Alternatively, in other examples, the first feature is a first material, the second feature is a second material, and the second material is different from the first material, that is, the first line body has the first material, and the second line body has the second material different from the first material. Alternatively, in other examples, the first feature is a first shape, the second feature is a second shape, and the second shape is different from the first shape, that is, the first line body has the first shape, and the second line body has the second shape different from the first shape. Alternatively, in other examples, the first feature is a first radial dimension, the second feature is a second radial dimension, and the second radial dimension is different from the first radial dimension, that is, the first line body has the first radial dimension, and the second line body has the second radial dimension different from the first radial dimension. The radial dimension here mainly refers to that the first line body and the second line body are different in the shape of the radial section, and that the radial dimension refers to the radial length of the radial section. Generally speaking, for the first line body or the second line body, the shapes of the radial sections and the radial dimensions are the same everywhere, and of course, may also not be the same anywhere. The first line body and the second line body may be considered to be different as long as they have different shapes of radial sections at one place or different radial dimensions at one place.

Of course, it can be understood that in this example, the first feature refers to the first color and the second feature refers to the second color. At this time, the first line body 151 and the second line body 152 have different colors, and the first line body 151 and the second line body 152 can be made different, but at the same time, the first line body 151 and the second line body 152 may also have different shapes, materials, patterns, or radial dimensions. That is to say, when the first line body 151 and the second line body 152 are different in one feature attribute, it is not limited whether the first line body 151 and the second line body 152 are the same in other feature attributes.

As shown in FIG. 3, the first line body 151 and the second line body 152 are represented by different lines, which indicate that the first line body 151 and the second line body 152 have different colors. That is, the outer layers of the first line body 151 and the second line body 152 have different visual colors. In addition, in other examples, for the features of color, pattern, material, shape, and radial dimension, the first line body and the second line body may be distinguished from each other by one of the features, or may be distinguished from each other by a plurality of features at the same time.

When the difference between the lengths of the first line body 151 and the second line body 152 is less than or equal to the diameter of the grass trimmer head 100, at this time, it is also considered that the length of the first line body 151 is substantially the same as the length of the second line body 152. Generally speaking, the lengths of the first line body 151 and the second line body 152 are the same. During threading, as long as the rope bodies at the two ends of the grass trimmer head 100 is ensured to be different, the grass trimmer line 15 can be ensured to be substantially in the middle position relative to the grass trimmer head 10, that is, the center point of the grass trimmer line 15 is substantially aligned with the center axis of the grass trimmer head 100. In actual operation, the grass trimmer line 15 on two sides of the grass trimmer head 100 is allowed to have a certain length error, which has little influence on the effect of trimming grass. Preferably, the difference between the lengths of the first line body 151 and the second line body 152 is less than or equal to the diameter of the grass trimmer head 100.

The first line body 151 and the second line body 152 are each a section of grass trimmer line, and the first line body 151 and the second line body 152 are connected together through the connecting portion 153. Preferably, the connecting portion 153 connects the first line body 151 and the second line body 152, so that the first line body 151 and the second line body 152 are in contact with and aligned in the radial direction. In this example, the connecting portion 153 specifically includes various adhesives.

A method for manufacturing the grass trimmer line 15 in a first example is introduced below.

(1) The first line body 151 and the second line body 152 with different features and having preset lengths are cut out. In this example, the features refer to the colors of the first line body 151 and the second line body 152, that is, the first line body 151 and the second line body 152 have different colors. In other examples, the first line body and the second line body with different patterns and having preset lengths may also be cut out. Alternatively, in other examples, the first line body and the second line body with different materials and having preset lengths may also be cut out. Alternatively, in other examples, the first line body and the second line body having different shapes and having preset lengths may also be cut out. Alternatively, in other examples, the first line body and the second line body with different radial dimensions and having preset lengths may also be cut out.

(2) One end of the first line body 151 is aligned and in contact with one end of the second line body 152, an adhesive is added to the joint and the first line body 151 and the second line body 152 are kept in close contact for a period of time until the adhesive is solidified and the first line body 151 and the second line body 152 are not disengaged in the natural state. The adhesive disposed between the first line body 151 and the second line body 152 forms the connecting portion 153.

In this example, the first line body 151 and the second line body 152 have different colors. It can be understood that the first line body 151 and the second line body 152 may be made of different materials. In other examples, the first line body and the second line body may also be made of the same material, and then a material body having a color different from that of the second line body is disposed on the first line body. In other examples, the first line body and the second line body may also have different shapes, the first line body and the second line body may be manufactured into different shapes respectively; or the first line body and the second line body may have the same shape first, and then the first line body is made different from the second line body in shape by a special processing method.

In this example, the lengths of the first line body 151 and the second line body 152 are substantially the same. The difference between the lengths of the first line body 151 and the second line body 152 is less than or equal to the diameter of the grass trimmer head. When the difference between the lengths of the first line body 151 and the second line body 152 is less than 0.15 meters, it is considered that the lengths of the first line body 151 and the second line body 152 are substantially the same. In this example, the length of the first line body 151 is greater than or equal to 1 meter, and the length of the second line body 152 is greater than or equal to 1 meter. In this way, the length of the grass trimmer line 15 is long enough to meet the needs of the grass trimmer to work for a period of time. In this example, when the grass trimmer line 15 passes through the grass trimmer head 100, the first line body 151 is located substantially on the left side of the grass trimmer head 100, and the second line body 152 is located substantially on the right side of the grass trimmer head 100. The portion located inside the grass trimmer head 100 is a portion of the first line body 151 or a portion of the second line body 152, or a portion of the first line body 151 and a portion of the second line body 152. In this example, the dimension of the connecting portion 153 is smaller than the diameter of the grass trimmer head 100, and more specifically, the length of the connecting portion 153 is less than or equal to 0.05 meters. In other examples, the length of the connecting portion is less than or equal to 0.02 meters. In other examples, the length of the connecting portion is less than or equal to 0.01 meters.

It is known that in general, the length of the grass trimmer line sold in the market is generally more than 2 meters. For the grass trimmer line 15 in this example, the length is also greater than or equal to 2 meters. In this way, the length of the first line body 151 is generally greater than or equal to 1 meter, the length of the second line body 152 is also greater than or equal to 1 meter, and at this time, if the difference between the lengths of the first line body 151 and the second line body 152 is less than or equal to the diameter of the grass trimmer head, the difference between the lengths of the first line body 151 and the second line body 152 is so small compared to the length of the grass trimmer line 15, so the difference can be ignored. Therefore, when the difference between the lengths of the first line body 151 and the second line body 152 is less than or equal to the diameter of the grass trimmer head 100, it may also be considered that the lengths of the first line body 151 and the second line body 152 are substantially the same. It is known that the diameter of the grass trimmer head 100 is usually between 0.08 meters and 0.15 meters, so when the difference between the lengths of the first line body 151 and the second line body 152 is less than or equal to 0.15 meters, it may also be considered that the lengths of the first line body 151 and the second line body 152 are substantially the same.

In this example, the first line body 151 has the first feature from the first free end 151a to the first non-free end 151b, and the second line body 152 has the second feature from the second free end 152a to the second non-free end 152b. That is, the first line body 151 has the first color from the first free end 151a to the first non-free end 151b, and the second line body 152 has the second color from the second free end 152a to the second non-free end 152b. In this way, when the grass trimmer line 15 passes through the grass trimmer head 100, the first line body 151 and the second line body 152 located on two sides of the grass trimmer head 100 have different colors, which is convenient for the user to observe.

Figure 4:
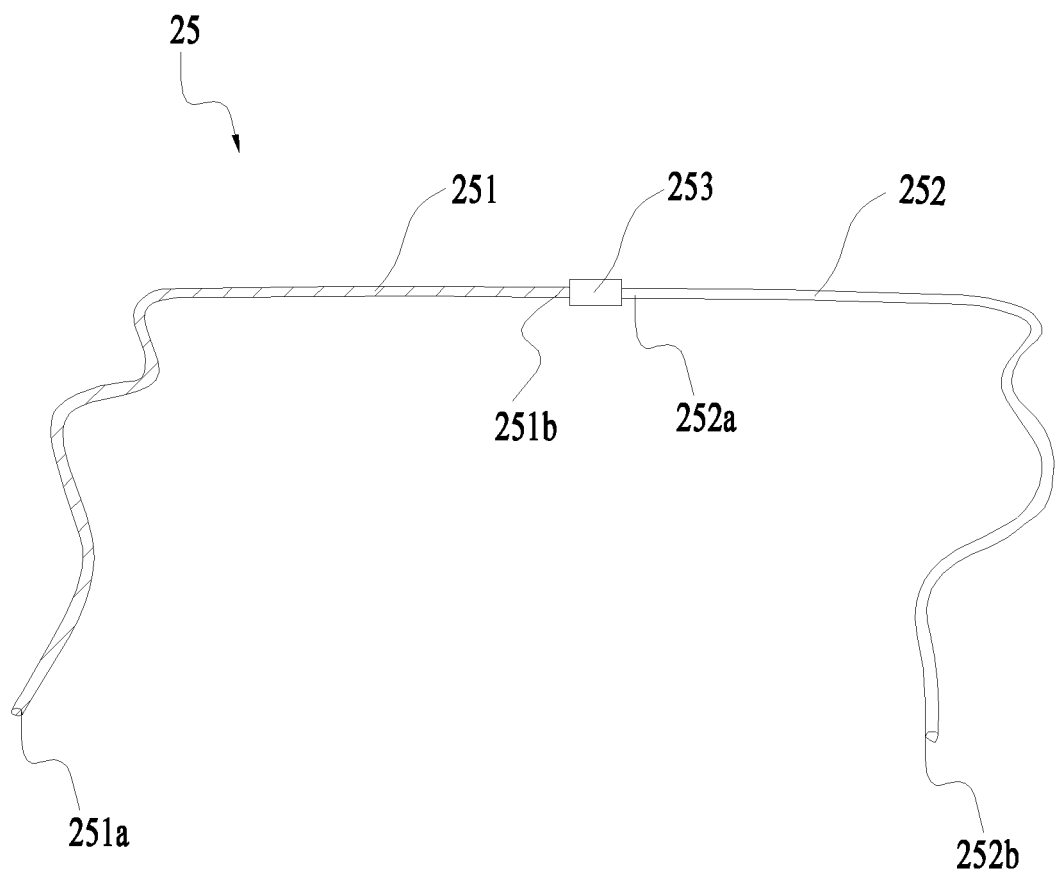
FIG. 4 is a plan view of a grass trimmer line according to a second example.

FIG. 4 shows a grass trimmer line 25 suitable for the grass trimmer of FIG. 1 according to a second example. The grass trimmer line 25 includes a first line body 251, a second line body 252, and a connecting portion 253. The first line body 251 has a first free end 251a and a first non-free end 251b. The second line body 252 has a second free end 252a and a second non-free end 252b. The connecting portion 253 connects the first non-free end 251b of the first line body 251 and the second non-free end 252b of the second line body 252, so that the first line body 251 and the second line body 252 are connected into the complete grass trimmer line 25. The lengths of the first line body 251 and the second line body 252 are substantially equal. The first line body 251 and the second line body 252 have different features. In this example, the first line body 251 and the second line body 252 have different colors. In other examples, the first line body and the second line body may also have different patterns. Alternatively, in other examples, the first line body and the second line body may also have different materials. Alternatively, in other examples, the first line body and the second line body may also have different shapes. Alternatively, in other examples, the first line body and the second line body may also have different radial dimensions, and the radial dimension here mainly refers to that the first line body and the second line body are different in the shape of the radial section, and that the radial dimension refers to the radial length of the radial section. Generally speaking, for the first line body or the second line body, the shapes of the radial sections and the radial dimensions are the same everywhere, and of course, may also not be the same anywhere. The first line body and the second line body may be considered to be different as long as they have different shapes of radial sections at one place or different radial dimensions at one place.

The connecting portion 253 acts on the first line body 251 and the second line body 252 at the same time. The connecting portion 253 fixes the first line body 251 and the second line body 252 along a length direction of the first line body 251 and a length direction of the second line body 251, respectively, so that the first line body 251 and the second line body 252 cannot move along the length direction of the first line body 251 and the length direction of the second line body 251 with respect to the connecting portion 253 under the action of a force smaller than a preset value, respectively.

Specifically, the connecting portion 253 is an adhesive tape, a heat-shrinkable sleeve, or a winding tape, as long as the first line body 251 and the second line body 252 can be fixedly connected.

A method for manufacturing the grass trimmer line 25 in the second example is introduced below.

(1) The first line body 251 and the second line body 252 with different features and having preset lengths are cut out. In this example, the features refer to the colors of the first line body 251 and the second line body 252, that is, the first line body 251 and the second line body 252 have different colors. In other examples, the first line body and the second line body with different patterns and having preset lengths may also be cut out. Alternatively, in other examples, the first line body and the second line body with different materials and having preset lengths may also be cut out. Alternatively, in other examples, the first line body and the second line body with different shapes and having preset lengths may also be cut out. Alternatively, in other examples, the first line body and the second line body with different radial dimensions and having preset lengths may also be cut out.

(2) One end of the first line body 251 is attached to one end of the second line body 252, and a heat-shrinkable sleeve or an adhesive tape or a winding tape is wound around the joint of the first line body 251 and the second line body 252. The heat-shrinkable sleeve or the adhesive tape or the winding tape is the connecting portion 253 that connects the first line body 251 and the second line body 252.

(3) The heat-shrinkable sleeve is heated by using a heating device such as a heat gun or a heating furnace make the heat-shrinkable sleeve deformed and be attached to the grass trimmer line 25.

In this example, the lengths of the first line body 251 and the second line body 252 are substantially the same. The difference between the lengths of the first line body 251 and the second line body 252 is less than or equal to the diameter of the grass trimmer head. When the difference between the lengths of the first line body 251 and the second line body 252 is less than 0.15 meters, it is considered that the lengths of the first line body 251 and the second line body 252 are substantially the same. In this example, the length of the first line body 251 is greater than or equal to 1 meter, and the length of the second line body 252 is greater than or equal to 1 meter. In this way, the length of the grass trimmer line 25 is long enough to meet the needs of the grass trimmer to work for a period of time. In this example, when the grass trimmer line 25 passes through the grass trimmer head 100, the first line body 251 is located substantially on the left side of the grass trimmer head 100, and the second line body 252 is located substantially on the right side of the grass trimmer head 100, and the portion located inside the grass trimmer head 100 is a portion of the first line body 251, or a portion of the second line body 252, or a portion of the first line body 251 and a portion of the second line body 252. In this example, the dimension of the connecting portion 253 is smaller than the diameter of the grass trimmer head 100, and more specifically, the length of the connecting portion 253 is less than or equal to 0.05 meters. In other examples, the length of the connecting portion is less than or equal to 0.02 meters. In other examples, the length of the connecting portion is less than or equal to 0.01 meters.

It is known that in general, the length of the grass trimmer line sold in the market is generally more than 2 meters. For the grass trimmer line 25 in this example, the length is also greater than or equal to 2 meters. In this way, the length of the first line body 251 is generally greater than or equal to 1 meter, the length of the second line body 252 is also greater than or equal to 1 meter, and at this time, if the difference between the lengths of the first line body 251 and the second line body 252 is less than or equal to the diameter of the grass trimmer head, the difference between the lengths of the first line body 251 and the second line body 252 is so small compared to the length of the grass trimmer line 25, so the difference can be ignored. Therefore, when the difference between the lengths of the first line body 251 and the second line body 252 is less than or equal to the diameter of the grass trimmer head 100, it can also be considered that the lengths of the first line body 251 and the second line body 252 are substantially the same. It is known that the diameter of the grass trimmer head 100 is usually between 0.08 meters and 0.15 meters, so when the difference between the lengths of the first line body 251 and the second line body 252 is less than or equal to 0.15 meters, it can also be considered that the lengths of the first line body 251 and the second line body 252 are substantially the same.

In this example, the first line body 251 has the first feature from the first free end 251a to the first non-free end 251b, and the second line body 252 has the second feature from the second free end 252a to the second non-free end 252b. That is, the first line body 251 has the first color from the first free end 251a to the first non-free end 251b, and the second line body 252 has the second color from the second free end 252a to the second non-free end 252b. In this way, when the grass trimmer line 25 passes through the grass trimmer head 100, the first line body 251 and the second line body 252 located on two sides of the grass trimmer head 100 have different colors, which is convenient for the user to observe.

Figure 5:
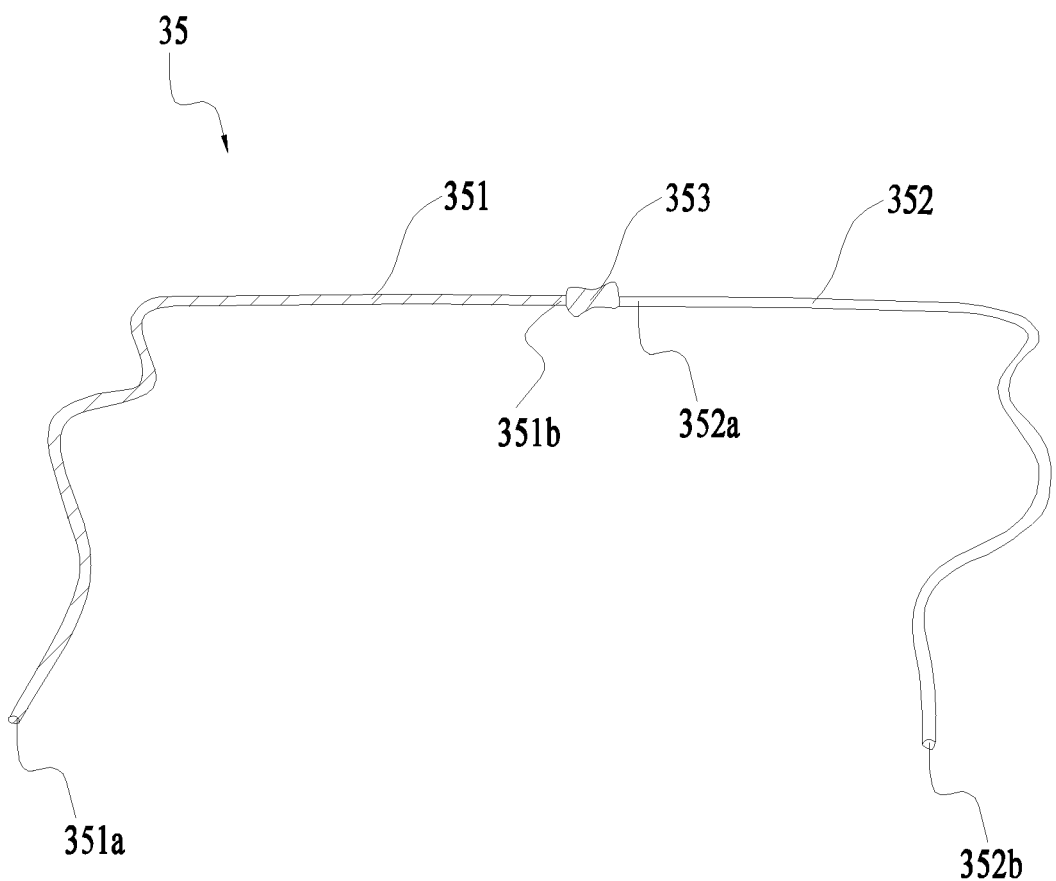
FIG. 5 is a plan view of a grass trimmer line according to a third example.

FIG. 5 shows a grass trimmer line 35 suitable for the grass trimmer of FIG. 1 according to a third example. The grass trimmer line 35 includes a first line body 351, a second line body 352, and a connecting portion 353. The first line body 351 has a first free end 351a and a first non-free end 351b. The second line body 352 has a second free end 352a and a second non-free end 352b. The connecting portion 353 connects the first non-free end 351b of the first line body 351 and the second non-free end 352b of the second line body 352, so that the first line body 351 and the second line body 352 are connected into the complete grass trimmer line 35. The lengths of the first line body 351 and the second line body 352 are substantially equal. The first line body 351 and the second line body 352 have different features. In this example, the first line body 351 and the second line body 352 have different colors. In other examples, the first line body and the second line body may have different patterns. Alternatively, in other examples, the first line body and the second line body may also have different materials. Alternatively, in other examples, the first line body and the second line body may also have different shapes. Alternatively, in other examples, the first line body and the second line body may also have different radial dimensions, and the radial dimension here refers to that the first line body and the second line body are different in the shape of the radial section, and that the radial dimension refers to the radial length of the radial section. Generally speaking, for the first line body or the second line body, the shapes of the radial sections and the radial dimensions are the same everywhere, and of course, may also not be the same anywhere. The first line body and the second line body may be considered to be different as long as they have different shapes of radial sections at one place or different radial dimensions at one place.

The joint of the first line body 351 and the second line body 352 may be a physical joint, such as ultrasonic welding, and may be a chemical joint, such as hot melting.

The connecting portion 353 includes a portion of the first line body 351 or a portion of the second line body 352, that is, the connecting portion 353 may be a portion of the first line body 351, or the connecting portion 353 may be a portion of the second line body 352, or the connecting portion 353 includes a portion of the first line body 351 and a portion of the second line body 352. The connecting portion 353 may have the same feature as the first line body 351 or the second line body 352. For example, in this example, the connecting portion 353 may have the same color as the first line body 351 or the second line body 352. It should be noted that due to the different processing techniques, the connecting portion 353 at the joint of the first line body 351 and the second line body 352 may also have different features from the first line body 351 or the second line body 352. For example, the connecting portion 353 formed by hot melting one end of the first line body 351 or the second line body 352 may become black and thick due to heat, so that the connecting portion 353 has a different color and shape from the first line body 351 or the second line body 352. At this time, it is still considered that the connecting portion 353 includes a portion of the first line body 351 or a portion of the second line body 352. In other examples, the connecting portion 353 has a different shape or radial dimension from the first line body 351 or the second line body 352, so that the user can more quickly find the midpoint of the grass trimmer line 35, or for the user with color discrimination impairments and vision impairments, the particular shape or dimension of the connecting portion 353 is advantageous.

In this example, the lengths of the first line body 351 and the second line body 352 are substantially the same. The difference between the lengths of the first line body 351 and the second line body 352 is less than or equal to the diameter of the grass trimmer head. When the difference between the lengths of the first line body 351 and the second line body 352 is less than 0.15 meters, it is considered that the lengths of the first line body 351 and the second line body 352 are substantially the same. In this example, the length of the first line body 351 is greater than or equal to 1 meter, and the length of the second line body 352 is greater than or equal to 1 meter. In this way, the length of the grass trimmer line 35 is long enough to meet the needs of the grass trimmer to work for a period of time. In this example, when the grass trimmer line 35 passes through the grass trimmer head 100, the first line body 351 is located substantially on the left side of the grass trimmer head 100, and the second line body 352 is located substantially on the right side of the grass trimmer head 100, and the portion located inside the grass trimmer head 100 is a portion of the first line body 351, or a portion of the second line body 352, or a portion of the first line body 351 and a portion of the second line body 352. In this example, the dimension of the connecting portion 353 is smaller than the diameter of the grass trimmer head 100, and more specifically, the length of the connecting portion 353 is less than or equal to 0.05 meters. In other examples, the length of the connecting portion is less than or equal to 0.02 meters. In other examples, the length of the connecting portion is less than or equal to 0.01 meters.

It is known that in general, the length of the grass trimmer line sold in the market is generally more than 2 meters. For the grass trimmer line 35 in this example, the length is also greater than or equal to 2 meters. In this way, the length of the first line body 351 is generally greater than or equal to 1 meter, the length of the second line body 352 is also greater than or equal to 1 meter, and at this time, if the difference between the lengths of the first line body 351 and the second line body 352 is less than or equal to the diameter of the grass trimmer head, the difference between the lengths of the first line body 351 and the second line body 352 is so small compared to the length of the grass trimmer line 35, so the difference can be ignored. Therefore, when the difference between the lengths of the first line body 351 and the second line body 352 is less than or equal to the diameter of the grass trimmer head 100, it can also be considered that the lengths of the first line body 351 and the second line body 352 are substantially the same. It is known that the diameter of the grass trimmer head 100 is usually between 0.08 meters and 0.15 meters, so when the difference between the lengths of the first line body 351 and the second line body 352 is less than or equal to 0.15 meters, it can also be considered that the lengths of the first line body 351 and the second line body 352 are substantially the same.

In this example, the first line body 351 has the first feature from the first free end 351a to the first non-free end 351b, and the second line body 352 has the second feature from the second free end 352a to the second non-free end 352b. That is, the first line body 351 has the first color from the first free end 351a to the first non-free end 351b, and the second line body 352 has the second color from the second free end 352a to the second non-free end 352b. In this way, when the grass trimmer line 35 passes through the grass trimmer head 100, the first line body 351 and the second line body 352 located on two sides of the grass trimmer head 100 have different colors, which is convenient for the user to observe.

A method for manufacturing the grass trimmer line 35 in the third example is introduced below.

(1) The first line body 351 and the second line body 352 with different features and having preset lengths are cut out. In this example, the features refer to the colors of the first line body 351 and the second line body 352, that is, the first line body 351 and the second line body 352 have different colors. In other examples, the first line body and the second line body with different patterns and having preset lengths may also be cut out. Alternatively, in other examples, the first line body and the second line body with different materials and having preset lengths may also be cut out. Alternatively, in other examples, the first line body and the second line body with different shapes and having preset lengths may also be cut out. Alternatively, in other examples, the first line body and the second line body with different radial dimensions and having preset lengths may also be cut out.

(2) One end of the first line body 351 is aligned and in contact with one end of the second line body 352, and then heating is performed for melting and fusion.

(3) The fusion point is cooled to be solidified and the first line body 351 and the second line body 352 are not disengaged in the natural state.

In this example, the first line body 351 and the second line body 352 have different colors. It can be understood that the first line body 351 and the second line body 352 may be made of different materials. In other examples, the first line body and the second line body may also be made of the same material, and then a material body having a color different from that of the second line body is disposed on the first line body. In other examples, the first line body and the second line body may also have different shapes, the first line body and the second line body may be manufactured into different shapes respectively; or the first line body and the second line body may have the same shape first, and then the first line body is made different from the second line body in shape by a special processing method.

Figure 6:
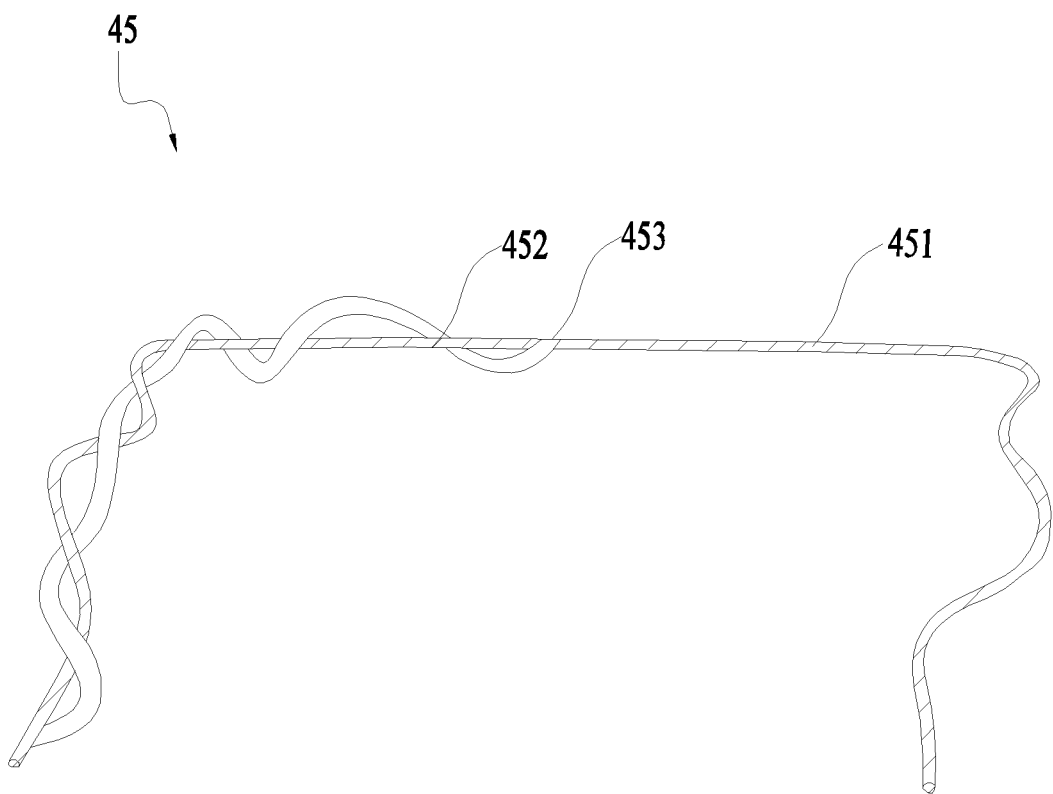
FIG. 6 is a plan view of a grass trimmer line according to a fourth example.

FIG. 6 shows a grass trimmer line 45 suitable for the grass trimmer of FIG. 1 according to a fourth example. The grass trimmer line 45 includes a first line body 451 and a second line body 452. The first line body 451 has a first feature, and the second line body 452 has at least a first portion and a second portion in a radial direction. The first portion has a second feature, and the second portion has a third feature. The first feature may be the same as the third feature, and the second feature is different from the first feature. In this way, the first line body 451 and the second line body 452 may also have different features. Specifically, for example, in this example, the first line body 451 has a first color, the first portion of the second line body 452 also has the first color, and the second portion of the second line body 452 has a second color different from the first color. The lengths of the first line body 451 and the second line body 452 are substantially equal. In this example, the first line body 451 is a single type of grass trimmer line, and the second line body 452 is a whole of two types of grass trimmer lines intertwined with each other through weaving. Of course, in an optional example, the connecting mode of the two types of grass trimmer lines 45 that form the second line body 452 may also be bonding, which is not limited herein.

The first line body 451 and the second line body 452 are connected at a place where the second portion of the second line body 452 is combined with the first line body 451. In this way, it can be considered that the place where the second portion is combined with the first line body 451 is a connecting portion 453 for connecting the first line body 451 and the second line body 452. At this time, the connecting portion 453 includes a part of the second portion.

In fact, it can be understood that in this example, the second line body 452 includes the first portion and the second portion, and the combination of the first portion and the second portion has made the second line body 452 different from the first line body 451 in shape.

A method for manufacturing the grass trimmer line 45 in the fourth example is introduced below.
(1) Two types of rope bodies with different features are connected together through a physical method to form a complete rope body. The physical method may be a weaving method, and the different features may be different colors.
(2) The complete rope body is divided into two sections at the midpoint or the preset point of the complete rope body, and the rope body with one of the features of one section is peeled off.

Another method for manufacturing the grass trimmer line 45 in the fourth example is introduced below.
(1) A rope body with the first future is taken out. The rope body having the first feature refers to that the rope body has the first color.
(2) The complete rope body is divided into two sections at the midpoint or the preset point of the complete rope body, and an additional rope body with the second feature is wound around one section of the rope body. The second feature is different from the first feature. The additional rope body having the second feature refers to that the additional rope body has the second color.

In this example, the lengths of the first line body 451 and the second line body 452 are substantially the same. The difference between the lengths of the first line body 451 and the second line body 452 is less than or equal to the diameter of the grass trimmer head. When the difference between the lengths of the first line body 451 and the second line body 452 is less than 0.15 meters, it is considered that the lengths of the first line body 451 and the second line body 452 are substantially the same. In this example, the length of the first line body 451 is greater than or equal to 1 meter, and the length of the second line body 452 is greater than or equal to 1 meter. In this way, the length of the grass trimmer line 45 is long enough to meet the needs of the grass trimmer to work for a period of time. In this example, when the grass trimmer line 45 passes through the grass trimmer head 100, the first line body 451 is located substantially on the left side of the grass trimmer head 100, and the second line body 452 is located substantially on the right side of the grass trimmer head 100, and the portion located inside the grass trimmer head 100 is a portion of the first line body 451, or a portion of the second line body 452, or a portion of the first line body 451 and a portion of the second line body 452. In this example, the dimension of the connecting portion 453 is smaller than the diameter of the grass trimmer head 100, and more specifically, the length of the connecting portion 453 is less than or equal to 0.05 meters. In other examples, the length of the connecting portion is less than or equal to 0.02 meters. In other examples, the length of the connecting portion is less than or equal to 0.01 meters.

It is known that in general, the length of the grass trimmer line sold in the market is generally more than 2 meters. For the grass trimmer line 45 in this example, the length is also greater than or equal to 2 meters. In this way, the length of the first line body 451 is generally greater than or equal to 1 meter, the length of the second line body 452 is also greater than or equal to 1 meter, and at this time, if the difference between the lengths of the first line body 451 and the second line body 452 is less than or equal to the diameter of the grass trimmer head, the difference between the lengths of the first line body 451 and the second line body 452 is so small compared to the length of the grass trimmer line 45, so the difference can be ignored. Therefore, when the difference between the lengths of the first line body 451 and the second line body 452 is less than or equal to the diameter of the grass trimmer head 100, it can also be considered that the lengths of the first line body 451 and the second line body 452 are substantially the same. It is known that the diameter of the grass trimmer head 100 is usually between 0.08 meters and 0.15 meters, so when the difference between the lengths of the first line body 451 and the second line body 452 is less than or equal to 0.15 meters, it can also be considered that the lengths of the first line body 451 and the second line body 452 are substantially the same.

In this example, the first line body 451 has the first feature from one end to the connecting point with the second line body 452, and the second line body 452 has the second feature from one end to the connecting point with the first line body 451. That is, the first line body 451 has the first color, and the second line body 452 has the second color. In this way, when the grass trimmer line 45 passes through the grass trimmer head 100, the first line body 451 and the second line body 452 located on two sides of the grass trimmer head 100 have different colors, which is convenient for the user to observe.

Figure 7:
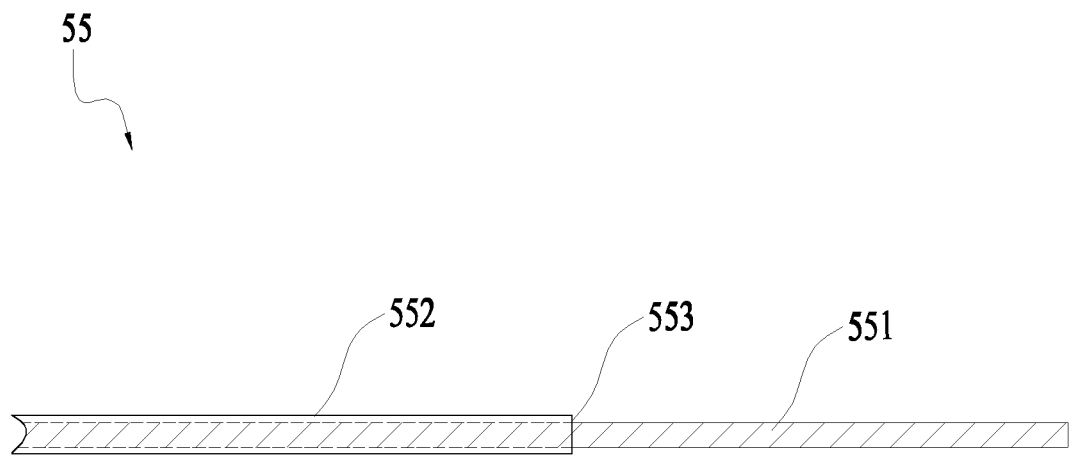
FIG. 7 is a plan view of a grass trimmer line according to a fifth example.

FIG. 7 shows a grass trimmer line 55 suitable for the grass trimmer of FIG. 1 according to a fifth example. The difference between this example and the fourth example is that the first portion of the second line body 552 is wrapped around the outside of the second portion by means of wrapping. That is, the materials forming the second line body 552 are arranged in layers in the radial direction. Specifically, in this example, the first line body 551 is made of a material in the radial direction, the second line body 552 is made of double layers of materials in the radial direction, the two materials have different colors or materials or patterns, and the midpoint of the grass trimmer line 55 is found by identifying the difference between the two materials.

The first line body 551 and the second line body 552 are connected at a place where the first portion of the second line body 552 is combined with the first line body 551. In this way, it can be considered that the place where the first portion is combined with the first line body 551 is a connecting portion 553 for connecting the first line body 551 and the second line body 552. At this time, the connecting portion 553 includes a part of the first portion.

In this example, the second line body 552 includes the first portion and the second portion. When the first portion and the second portion are combined, the radial dimension of the second line body 552 is different from that of the first line body 551.

A first method for manufacturing the grass trimmer line 55 in the fifth example is introduced below.
(1) A rope body with the first feature is taken out. The rope body having the first feature may refer to that the rope body has the first color.
(2) A material layer with the second feature is wrapped around the surface of the rope body to form a complete rope body. The second feature is different from the first feature. The material layer having the second future may refer to that the material layer has a second color.
(3) The complete rope body is divided into two sections at the midpoint or the preset point of the complete rope body, and the material layer of one section is peeled off.

A second method for manufacturing the grass trimmer line 55 in the fifth example is introduced below.
(1) A rope body with the first feature is taken out. The rope body having the first feature refers to that the rope body has the first color.
(2) The complete rope body is divided into two sections at the midpoint or the preset point of the complete rope body, and an additional rope body with the second feature is wrapped around one section of the rope body. The second feature is different from the first feature. The additional rope body having the second feature refers to that the additional rope body has the second color.

In this example, the lengths of the first line body 551 and the second line body 552 are substantially the same. The difference between the lengths of the first line body 551 and the second line body 552 is less than or equal to the diameter of the grass trimmer head. When the difference between the lengths of the first line body 551 and the second line body 552 is less than 0.15 meters, it is considered that the lengths of the first line body 551 and the second line body 552 are substantially the same. In this example, the length of the first line body 551 is greater than or equal to 1 meter, and the length of the second line body 552 is greater than or equal to 1 meter. In this way, the length of the grass trimmer line 55 is long enough to meet the needs of the grass trimmer to work for a period of time. In this example, when the grass trimmer line 55 passes through the grass trimmer head 100, the first line body 551 is located substantially on the left side of the grass trimmer head 100, and the second line body 552 is located substantially on the right side of the grass trimmer head 100, and the portion located inside the grass trimmer head 100 is a portion of the first line body 551, or a portion of the second line body 552, or a portion of the first line body 551 and a portion of the second line body 552. In this example, the dimension of the connecting portion 553 is smaller than the diameter of the grass trimmer head 100, and more specifically, the length of the connecting portion 553 is less than or equal to 0.05 meters. In other examples, the length of the connecting portion is less than or equal to 0.02 meters. In other examples, the length of the connecting portion is less than or equal to 0.01 meters.

It is known that in general the length of the grass trimmer line sold in the market is generally more than 2 meters. For the grass trimmer line 55 in this example, the length is also greater than or equal to 2 meters. In this way, the length of the first line body 551 is generally greater than or equal to 1 meter, the length of the second line body 552 is also greater than or equal to 1 meter, and at this time, if the difference between the lengths of the first line body 551 and the second line body 552 is less than or equal to the diameter of the grass trimmer head, the difference between the lengths of the first line body 551 and the second line body 552 is so small compared to the length of the grass trimmer line 55, so the difference can be ignored. Therefore, when the difference between the lengths of the first line body 551 and the second line body 552 is less than or equal to the diameter of the grass trimmer head 100, it can also be considered that the lengths of the first line body 551 and the second line body 552 are substantially the same. It is known that the diameter of the grass trimmer head 100 is usually between 0.08 meters and 0.15 meters, so when the difference between the lengths of the first line body 551 and the second line body 552 is less than or equal to 0.15 meters, it can also be considered that the lengths of the first line body 551 and the second line body 552 are substantially the same.

In this example, the first line body 551 has the first feature from an end to the connecting point with the second line body 552, and the second line body 552 has the second feature from an end to the connecting point with the first line body 551. That is, the first line body 551 has the first color, and the second line body 552 has the second color. In this way, when the grass trimmer line 55 passes through the grass trimmer head 100, the first line body 551 and the second line body 552 located on two sides of the grass trimmer head 100 have different colors, which is convenient for the user to observe.

The basic principles, main features and advantages of the present disclosure have been shown and described above. It can be understood by any person skilled in the art that the foregoing examples are not intended to limit the present disclosure in any form. Technical solutions obtained by equivalent substitution or equivalent transformation are within the scope of the present disclosure.

What is claimed is:

1. A grass trimmer line suitable for a grass trimmer head, comprising:
   a first line body comprising a first free end and a first non-free end;
   a second line body comprising a second free end and a second non-free end, wherein a length of the second line body is substantially equal to a length of the first line body, the first line body has a first feature comprising a first material, the second line body has a second feature comprising a second material and the second feature is different from the first feature; and
   a connecting portion configured to connect the first non-free end of the first line body and the second non-free end of the second line body, so that the first line body and the second line body are connected into the grass trimmer line.

2. A grass trimmer line suitable for a grass trimmer head, comprising:
   a first line body comprising a first free end and a first non-free end;
   a second line body comprising a second free end and a second non-free end, wherein a length of the second line body is substantially equal to a length of the first line body, the first line body has a first feature, the second line body has a second feature and the second feature is different from the first feature; and a connecting portion configured to connect the first non-free end of the first line body and the second non-free end of the second line body, so that the first line body and the second line body are connected into the grass trimmer line, and wherein the first feature is a first color and the second feature is a second color.

3. The grass trimmer line suitable for a grass trimmer head of claim 1, wherein the first feature further comprises a first shape and the second feature further comprises a second shape.

4. The grass trimmer line suitable for a grass trimmer head of claim 1, wherein the first feature further comprises a first pattern and the second feature further comprises a second pattern.

5. The grass trimmer line suitable for a grass trimmer head of claim 1, wherein the first feature further comprises a first radial dimension and the second feature further comprises a second radial dimension.

6. The grass trimmer line suitable for a grass trimmer head of claim 1, wherein the connecting portion is an adhesive.

7. The grass trimmer line suitable for a grass trimmer head of claim 1, wherein the connecting portion comprises a portion of the first line body or a portion of the second line body.

8. The grass trimmer line of claim 1, wherein the connecting portion is a heat-shrinkable sleeve or an adhesive tape.

9. The grass trimmer line suitable for a grass trimmer head of claim 1, wherein the length of the first line body is greater than or equal to 1 meter and the length of the second line body is greater than or equal to 1 meter.

10. The grass trimmer line suitable for a grass trimmer head of claim 1, wherein a difference between the length of the first line body and the length of the second line body is less than or equal to 0.15 meters.

11. The grass trimmer line suitable for a grass trimmer head of claim 1, wherein the first line body has the first feature from the first free end to the first non-free end and the second line body has the second feature from the second free end to the second non-free end.

12. The grass trimmer line suitable for a grass trimmer head of claim 1, wherein the connecting portion is a portion of the first line body or a portion of the second line body.

13. A grass trimmer line suitable for a grass trimmer head, comprising:

a first line body comprising a first free end and a first non-free end; and a second line body comprising a second free end and a second non-free end, wherein a length of the second line body is substantially equal to a length of the first line body, the first line body has a first feature, the second line body has a second feature and the second feature is different from the first feature;

wherein the second non-free end is connected to the first non-free end, and wherein the first feature is a first color and the second feature is a second color.

14. The grass trimmer line suitable for a grass trimmer head of claim 13, wherein the length of the first line body is greater than or equal to 1 meter and the length of the second line body is greater than or equal to 1 meter.

15. The grass trimmer line suitable for a grass trimmer head of claim 13, wherein the first line body has the first feature from the first free end to the first non-free end and the second line body has the second feature from the second free end to the second non-free end.

16. The grass trimmer line suitable for a grass trimmer head of claim 13, wherein a difference between the length of the first line body and the length of the second line body is less than or equal to 0.15 meters.

17. A grass trimmer head, comprising:

a spool configured for a grass trimmer line winding around; and a head housing formed with an accommodation space for accommodating at least part of the spool, wherein the head housing is further formed with a left threading hole for the grass trimmer line to come out from a left side of the grass trimmer head, and is further formed with a right threading hole for the grass trimmer line to come out from a right side of the grass trimmer head;

wherein the grass trimmer line comprises:

a first line body comprising a first free end and a first non-free end;

a second line body comprising a second free end and a second non-free end, wherein a length of the second line body is substantially equal to a length of the first line body, the first line body has a first feature, the second line body has a second feature and the second feature is different from the first feature;

wherein the first feature is a first color and the second feature is a second color, and a connecting portion configured to connect the first non-free end of the first line body and the second non-free end of the second line body, so that the first line body and the second line body are connected into the grass trimmer line.

* * * * *